United States Patent
Asada

(10) Patent No.: US 8,508,753 B2
(45) Date of Patent: Aug. 13, 2013

(54) OPTICAL READING DEVICE, CONTROL METHOD FOR AN OPTICAL READING DEVICE, AND PROGRAM

(75) Inventor: Kenji Asada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 13/006,205

(22) Filed: Jan. 13, 2011

(65) Prior Publication Data

US 2011/0170125 A1 Jul. 14, 2011

(30) Foreign Application Priority Data

Jan. 13, 2010 (JP) .................................. 2010-004628

(51) Int. Cl.
*G06F 15/00* (2006.01)
(52) U.S. Cl.
USPC ........................................................ 358/1.12
(58) Field of Classification Search
USPC ........................................................ 358/1.12
See application file for complete search history.

(56) References Cited

U.S. PATENT DOCUMENTS

| | | | |
|---|---|---|---|
| 5,751,448 A | 5/1998 | Kim et al. | |
| 7,090,131 B2 | 8/2006 | Natsuno | |
| 2004/0212648 A1* | 10/2004 | Arakawa et al. | 347/14 |
| 2005/0286091 A1* | 12/2005 | Harel et al. | 358/474 |

FOREIGN PATENT DOCUMENTS

| | | |
|---|---|---|
| EP | 0661600 A | 7/1995 |
| JP | 3052382 A | 3/1991 |
| JP | 2000-295383 A | 10/2000 |
| JP | 2001-26158 A | 1/2001 |
| JP | 2005-229514 A | 8/2005 |
| JP | 2007-295283 A | 11/2007 |
| JP | 2007295283 A | 11/2007 |
| JP | 2009-284191 A | 12/2009 |

OTHER PUBLICATIONS

European Search Report, May 24, 2011.

* cited by examiner

*Primary Examiner* — Saeid Ebrahimi Dehkordy
(74) *Attorney, Agent, or Firm* — Nutter McClennen & Fish LLP; John J. Penny, Jr.; Michael P. Visconti, III

(57) ABSTRACT

The length of the process from capturing an image by an optical reading unit to discharging the medium is shortened, and throughput improved. A media transportation mechanism conveys a medium to be scanned. An optical reader disposed to the medium transportation path optically reads the conveyed medium. A storage unit stores the captured image. A transmission unit reads and transmits the captured image stored in the storage unit to another device. A discharge control unit discharges the medium while the captured image is being transmitted to the other device after the optical reader finishes scanning the medium.

5 Claims, 10 Drawing Sheets

OPTICAL READING DEVICE, CONTROL METHOD FOR AN OPTICAL READING DEVICE, AND PROGRAM

Priority is claimed under 35 U.S.C. §119 to Japanese Patent Application No. 2010-4628 filed on Jan. 13, 2010, which is hereby incorporated by reference in its entirety.

BACKGROUND

1. Technical Field

The present invention relates to an optical reading device that conveys a medium and optically reads the surface of the medium, to a method of controlling the optical reading device, and to a program.

2. Related Art

Japanese Unexamined Patent Appl. Pub. JP-A-2009-284191 teaches an optical reading device (information medium processing device) having a transportation unit that conveys a medium such as a check inserted to the apparatus, and an optical reading unit (scanner) that optically captures an image of the conveyed medium. This optical reading device images the surface of the medium with the scanner while conveying the inserted medium past the scanner by the transportation unit, and then discharges the medium from the optical reading device after scanning is completed. The media transportation operation is executed in the optical reading device described in JP-A-2009-284191 after imaging by the scanner and transmission of the captured image data to the host computer are completed.

An optical reading device such as taught in JP-A-2009-284191 may also be used to continuously process numerous media, and therefore needs to shorten the time consumed by the process, from image scanning by the optical reading unit through media discharge in order to improve throughput.

SUMMARY

At least one embodiment of the invention shortens the time consumed by the process, from image scanning by the optical reading unit through media discharge, thereby improving throughput.

A first aspect of at least one embodiment of the invention is an optical reading device including a transportation unit that conveys a medium to be scanned; an optical reading unit that is disposed in the medium transportation path and optically reads the medium conveyed by the transportation unit; a storage unit that stores a captured image captured by the optical reading unit; a transmission unit that reads and transmits the captured image stored in the storage unit to another device; and a discharge control unit that controls the transportation unit and discharges the medium while the transmission unit is transmitting the captured image to the another device after scanning the medium by the optical reading unit is completed.

This aspect of at least one embodiment of the invention enables discharging the scanned medium by the discharge control unit during transmission of the captured image, including transmission preparation time, by the transmission unit, and can improve the throughput of the overall process compared with the related art in which the discharge operation is executed after transmission of the captured image is completed. Scanning the medium includes scanning the top, the bottom, or both sides.

At least one embodiment of the invention can shorten the time of the process from capturing an image using an optical reading unit to discharging the medium, and can improve throughput.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 10A and 10B are timing charts of the operation of the dot impact printer.

DESCRIPTION OF EMBODIMENTS

A preferred embodiment of the present invention is described below with reference to the accompanying figures.

Figure 1:
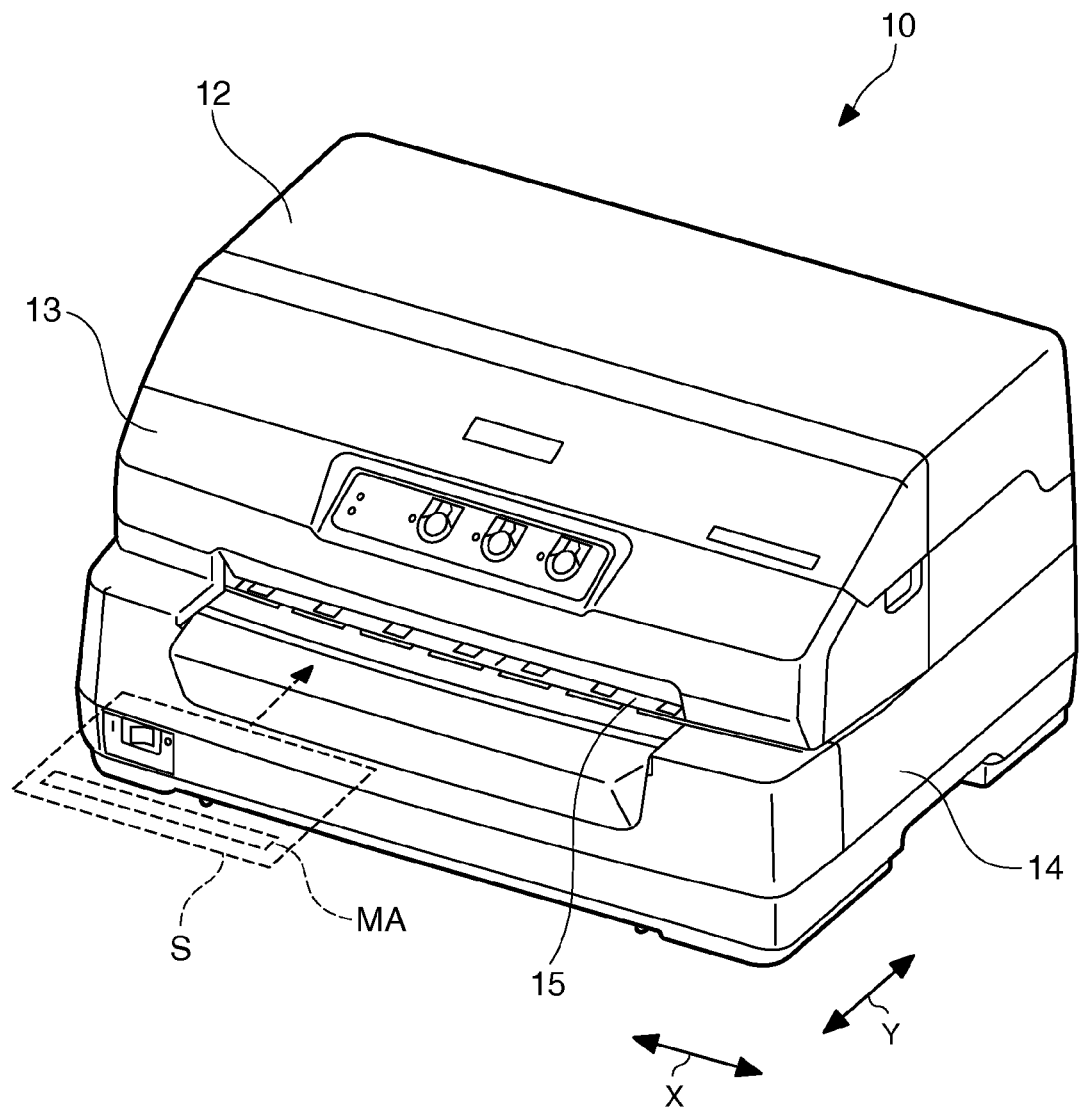
FIG. 1 is an external oblique view of a dot impact printer according to a preferred embodiment of the invention.

FIG. 1 is a front oblique view showing the appearance of a dot impact printer according to a preferred embodiment of the invention.

Figure 2:
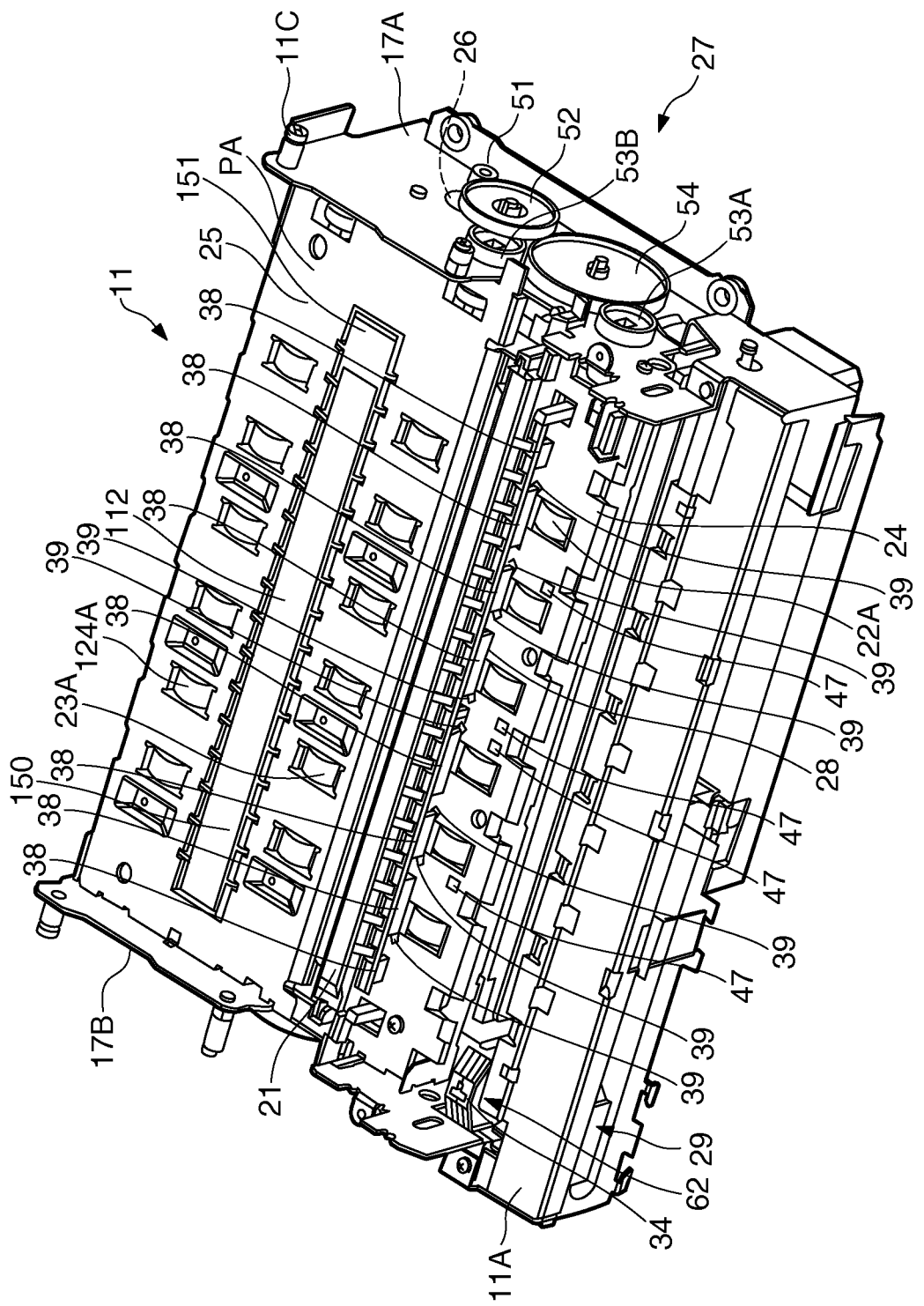
FIG. 2 is an oblique view of the print assembly.
Figure 3:
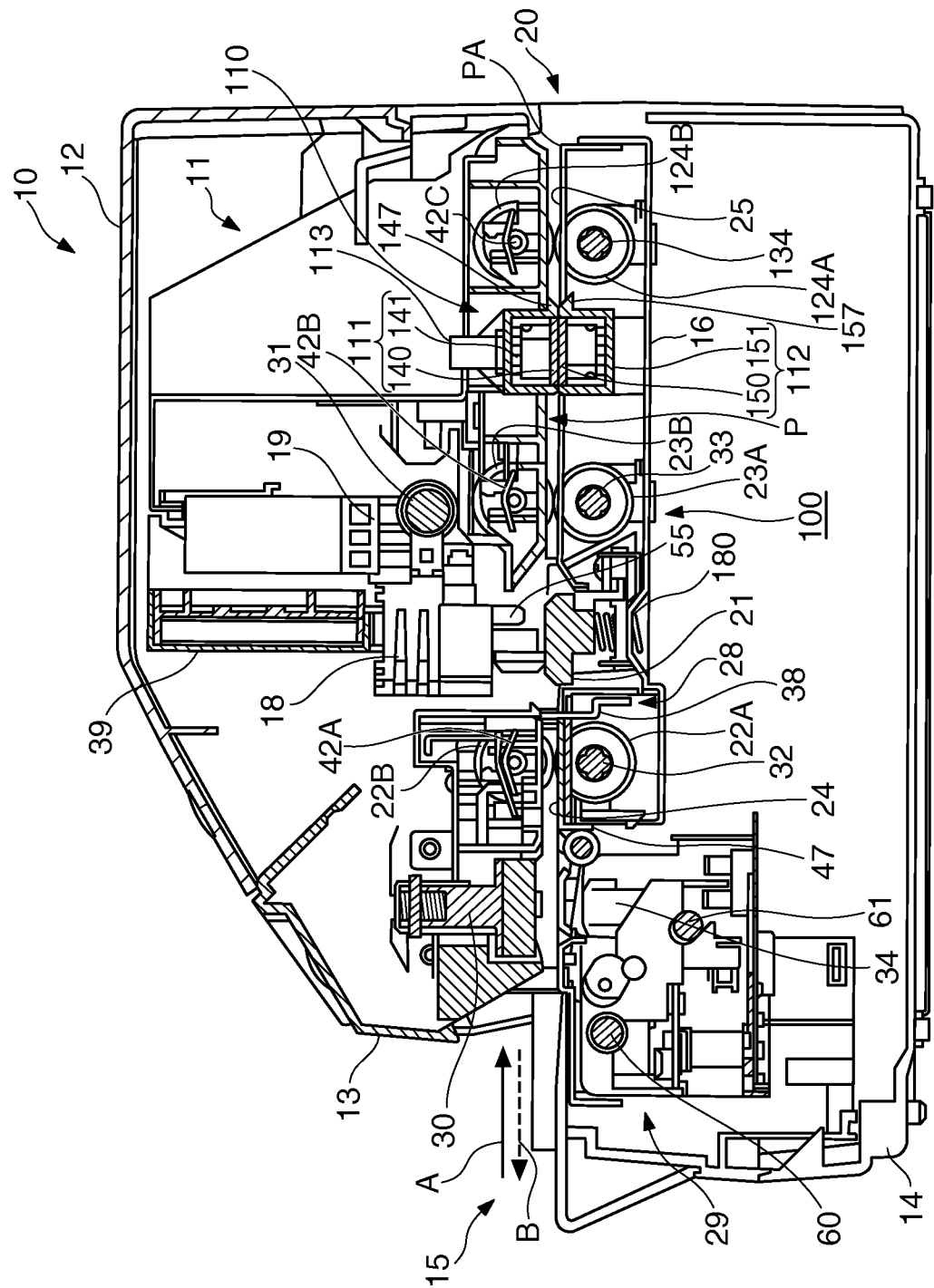
FIG. 3 is a section view of the print assembly.

FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon carriage (not shown in the figure) therebetween in order to form dots on the recording surface of the recording medium S. The dot impact printer 10 has an optical reader (scanner) 110 (FIG. 3) and thus also functions as an optical reading device that can optically read text, symbols, images, and other content presented on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention, checks and promissory notes (collectively referred to as simply checks herein) issued on a bank account, for example, and passbooks issued by a bank or other financial institution, are used as the recording medium S.

Checks are slips on which MICR (magnetic ink character recognition) information containing the user's account number and a serial check number, for example, are printed in an MICR area MA on the check surface. A passbook is a bound booklet of plural blank pages that can be printed on when the passbook is open. A magnetic stripe is typically formed on the outside surface of at least one of the passbook covers.

Note that of the four sides of a rectangular recording medium S, the edge on the side that is inserted into the dot impact printer 10 is referred to herein as the leading edge or end, and the edge on the opposite side as the leading end is referred to as the trailing edge or end.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent from a host computer 200 described below to the dot impact printer 10.

The side where the manual insertion opening 15 is formed, that is, the left side as seen in FIG. 3, is referred to herein as the front, and the side where the paper exit 20 is formed, that is, the right side in FIG. 3, is referred as the rear.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven by a timing belt (not shown in the figure) by driving a carriage drive motor 56 (FIG. 4) that drives the carriage 19 forward or reverse, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the subscanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded up inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is urged toward the recording head 18 and elastically supported by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media transportation mechanism 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media transportation motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media transportation motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media transportation motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media transportation motor 26 rotates forward, the first drive roller 22A, second drive roller 23A, and third drive roller 124A shown in FIG. 3 convey the recording medium S in the sub-scanning direction inside the printer assembly 11 as denoted by arrow A in the figure, and convey the recording medium S in the direction in which it is discharged from the printer assembly 11 as indicated by arrow B in the figure when the media transportation motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment plates 38 contact the leading end of the recording medium S and thereby align the orientation of the recording medium S.

As shown in FIG. 2, the printer assembly 11 has a plurality of alignment sensors 39 that detect the presence of the recording medium S driven in contact with the alignment plates 38. The alignment sensors 39 are disposed in the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls the operations of dot impact printer 10, including driving the media transportation motor 26, the scanning of carriage 19, the recording operation of the recording wires of the recording head 18, and the reading (scanning) operation of the optical reader 110.

The printer assembly 11 also has a plurality of media edge sensors 47 that detect insertion of a recording medium S into the transportation path P in front of the first drive roller 22A. The media edge sensors 47 are reflective sensors having a light-emitting unit that emits light toward the transportation path P and a photodetection unit that detects the reflection of the emitted light, and detects the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted into the transportation path P when the photodetection units of all insertion detection sensors 47 sense light and then photodetection by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 that reads information printed or otherwise presented on the top surface of the recording medium S, and a second scanner 112 disposed opposite the first scanner 111 that similarly reads information printed or otherwise presented on the bottom surface of the recording medium S. The recording medium S is normally inserted from the manual insertion opening 15 so that the side on which the MICR information is printed is the bottom surface.

The first scanner 111 and second scanner 112 are optical image sensors that are disposed between the second drive roller 23A and third drive roller 124A and continuously read information on the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the scanning area of the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is formed between the surfaces of the glass plates 140, 150. When scanning a recording medium S, the conveyed recording medium S pushes the first scanner 111 up and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The photosensors (not shown in the figure) of the first scanner 111 and second scanner 112 are arrayed in a row in the main scanning direction of the dot impact printer 10, and scan lines extending in the main scanning direction. The photosensors of the first scanner 111 and second scanner 112 are disposed across a wider range in the main scanning direction than the printing range of the recording head 18, and can scan a wider range than any recording medium that can be printed on by the dot impact printer 10. The optical reader 110 can therefore read the entire surface of any recording medium S that can be used in the dot impact printer 10.

The first scanner 111 and second scanner 112 are disposed on opposite sides of the transportation path P as shown in FIG. 3 with the photosensor array of the first scanner 111 and the photosensor array of the second scanner 112 offset approximately 5 mm from each other in the transportation direction of the recording medium S. This configuration prevents the light from one light source from affecting the photosensors of the other scanner, and therefore enables achieving higher quality scans.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the subscanning direction) is set according to the scanning resolution in the main scanning direction, and the conveyance speed of the recording medium S during scanning is adjusted according such parameters as the scanning resolution and how fast the photosensor output signals can be processed.

Figure 4:
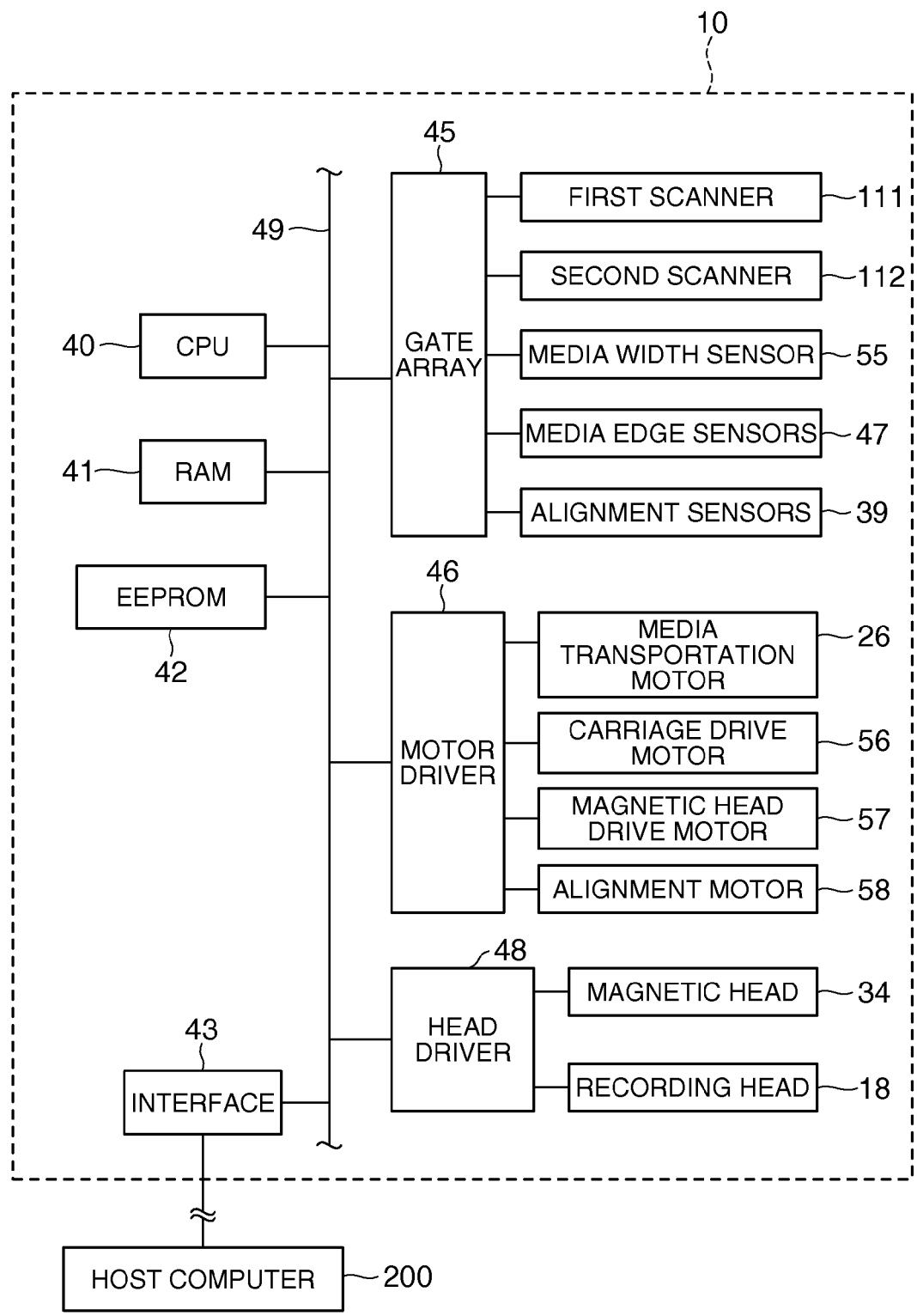
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 includes a CPU 40 as a control unit that controls the dot impact printer 10 based on a control program, RAM 41 that temporarily stores data and a control program read from EEPROM 42 by the CPU 40, EEPROM 42 that stores the control program executed by the CPU 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected.

RAM 41 functions as a storage unit, and renders an image buffer (not shown in the figure) that temporarily stores the image data captured by the optical reader 110. The CPU 40 also functions as a transmission unit that reads and transfers to the host computer 200 the image data stored in the image buffer rendered by RAM 41.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the CPU 40. The first scanner 111 and second scanner 112 optically read the surface of the recording medium S using a CIS, and supply the detection voltages from each pixel of the CIS to the gate array 45. The gate array 45 quantizes the analog voltages supplied from the first scanner 111 and second scanner 112 and outputs the resulting digital data to the CPU 40.

The motor driver 46 is connected to the media transportation motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensors 47 are connected to the recording head 18 and magnetic head 34, and supply drive current to the recording head 18 to drive the recording wires to print. The media edge sensors 47 also output drive current for reading and writing to the magnetic head 34, and when reading magnetic data detect and output the detection voltage (analog voltage) from the magnetic head 34 as digital data to the CPU 40.

The CPU 40 acquires detection signals from the sensors and drives the motors to convey the recording medium S by the gate array 45, motor driver 46, and head driver 48 based on a control program stored in EEPROM 42, and drives the heads to record on the recording medium S.

The CPU 40 also conveys the recording medium S with the media transportation mechanism 100, and reads the surface of the recording medium S using the gate array 45 and first scanner 111 and second scanner 112. While scanning, the CPU 40 temporarily stores the data input from the gate array 45 sequentially to a buffer (not shown in the figure) rendered in RAM 41. The CPU 40 also reads and outputs the image data stored in the buffer (not shown in the figure) to the host computer 200 through the interface 43.

Figure 5A:
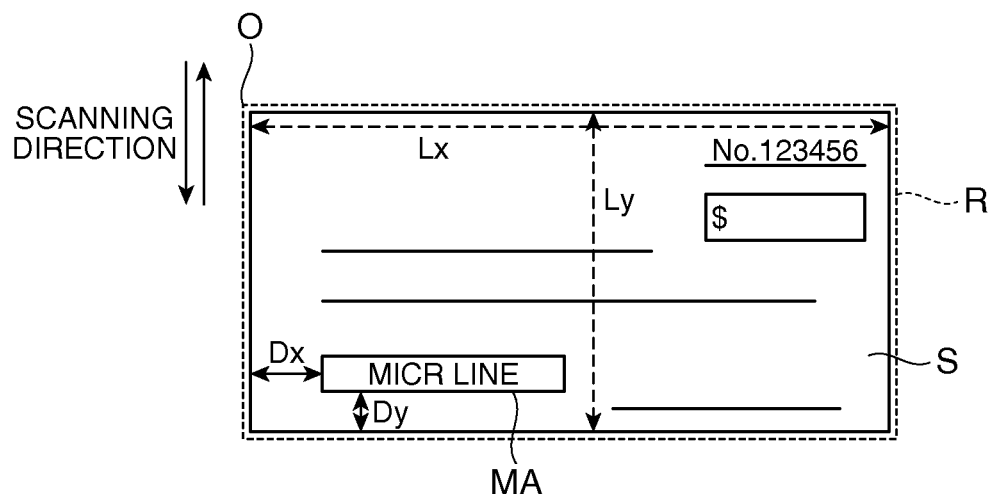
FIGS. 5A and 5B show an example of a medium to be scanned.
Figure 5B:
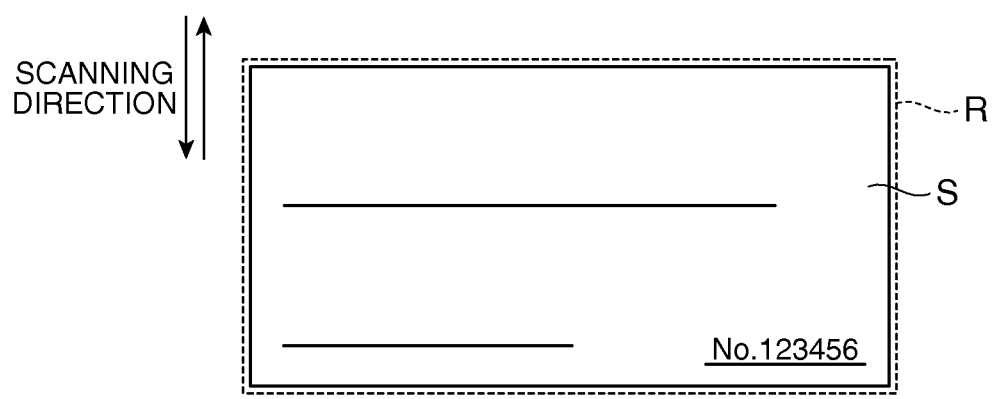

FIGS. 5A and 5B show an example of a check as a recording medium S that is processed by the dot impact printer 10. FIG. 5A shows the front and FIG. 5B shows the back of the check.

The check used as the recording medium S is a horizontally long rectangle, is inserted into the dot impact printer 10 with one of the long sides at the leading edge, and is conveyed in the direction of the short side as shown in the figure. Note that the length (width) of the long side of the recording medium S is Lx, and the length (height) of the short side is Ly.

As shown in FIG. 5A, the surface of the recording medium S has fields for writing or printing the date, check amount, payee, name and address of the payer, a signature line, and a MICR area MA where MICR characters are printed. As shown in FIG. 5B, fields for writing or printing the account number and the name of the financial institution on which the check is drawn are provided, and a check serial number is printed, on the back of the recording medium S.

The recording medium S shown in FIGS. 5A and 5B is inserted from the manual insertion opening 15 into the dot impact printer 10 with the side shown in FIG. 5A facing down and the back shown in FIG. 5B facing up. The front side shown in FIG. 5A is therefore the bottom surface as referred to herein and is read by the second scanner 112, and the backside shown in FIG. 5B is the top surface read by the first scanner 111.

The scanning range R of the first scanner 111 is set according to the size of the recording medium S, and is slightly greater than the width Lx and height Ly of the recording medium S as indicated by the dotted line in FIG. 5B. The width and height of the scanning range R are sized to add a scanning margin to the width Lx and height Ly of the recording medium S, and this scanning margin is typically a few millimeters, for example. The first scanner 111 can therefore optically scan the entire back of the recording medium S. The magnetic head 34 also reads the MICR text in the MICR area MA shown in FIG. 5A.

The scanning range R of the second scanner 112 is similarly set according to the size of the recording medium S, and is slightly greater than the width Lx and height Ly of the recording medium S as indicated by the dotted line in FIG. 5A. In this embodiment of the invention, the width and height of the scanning range R are sized to add a scanning margin to the width Lx and height Ly of the recording medium S, and this scanning margin is typically a few millimeters, for example. The first scanner 111 can therefore optically read the entire back of the recording medium S.

The dot impact printer 10 reads the recording medium S using the optical reader 110 while conveying the recording medium S forward or reverse in the direction of the short side. The direction in which the recording medium S is conveyed while scanning is automatically determined so that scanning the part to be read can be completed with the shortest possible transportation distance.

Commands are sent from the host computer 200 to the dot impact printer 10 through the interface 43, and the size (Lx, Ly) of the recording medium S to be scanned is set by command. The CPU 40 identifies the size of the recording medium S based on the command received from the host computer 200 and sets the scanning range R accordingly. Information identifying the location of the MICR area MA on the recording medium S is also contained in the command sent from the host computer 200. The location of the MICR area MA may be specified by the distance Dx from a short side of the recording medium S and the distance Dy from a long side, for example. The CPU 40 controls the motor driver 46 and head driver 48 based on the received command, and drives the magnetic head drive motor 57 to read with the magnetic head 34.

The commands sent from the host computer 200 to the dot impact printer 10 include setup commands, a start scanning (reading) command, and an eject paper command.

The setup commands are commands for specifying the scanning resolution of the optical reader 110, the scanning side (whether to scan the top or bottom), the scanning direction, the scanning mode (color or monochrome scanning), the number of gray levels if monochrome scanning is selected, the LED output color if monochrome scanning is selected, and the scanning area (the start and endpoints of the scanning area) if only part of the scanning range R is to be scanned. Note that the coordinates of the start and endpoints of the scanning area are coordinates referenced to an origin at the left edge of the leading end of the scanning range R, for example. After receiving the setup command, the CPU 40 extracts the values specified in the setup command as the setting.

The setup commands also include a command that specifies whether or not to eject the recording medium S when the optical reader 110 finishes scanning even if the image data is still being transmitted to the host computer 200, and if the recording medium S is to be discharged, a command that specifies whether to discharge the recording medium S from the manual insertion opening 15 or the paper exit 20.

The process of discharging the recording medium S while sending the image data captured by the optical reader 110 to the host computer 200 is referred to below as a "discharge during transmission process." During transmission includes while determining if the host computer 200 can receive and while preparing to transmit, including the transmission setup process of the CPU 40. Whether or not to execute the discharge during transmission process, and whether to discharge the recording medium S from the manual insertion opening 15 or the paper exit 20, can be preset by the user using the host computer 200, in which case the setup command is generated to reflect the user setting.

This discharge during transmission process shortens the total process time from scanning the recording medium S to discharging the recording medium S compared with the method of the related art in which the recording medium S is discharged after the recording medium S is scanned by the optical reader 110, and thereby improves throughput. This discharge during transmission process is described in further detail below.

The start scanning command is a command that tells the dot impact printer 10 to start the scanning process. The start scanning command includes information specifying the type of scanning operation, that is, a full scan that reads all of the scanning range R, or a partial scan that reads only the scanning area specified by the setup command. When the CPU 40 receives the start scanning command, it controls the gate array 45 and motor driver 46 to start scanning by the optical reader 110.

The discharge command is a command that specifies whether to discharge the recording medium S from the manual insertion opening 15 or paper exit 20 after scanning is completed, and includes a discharge instruction and information specifying the discharge direction (the manual insertion opening 15 or paper exit 20). When the CPU 40 receives the discharge command, it discharges the recording medium S from the side specified by the discharge command.

The scanning operations of the dot impact printer 10 when conveying the recording medium S forward and when conveying the recording medium S in reverse are described next.

Figure 6A:
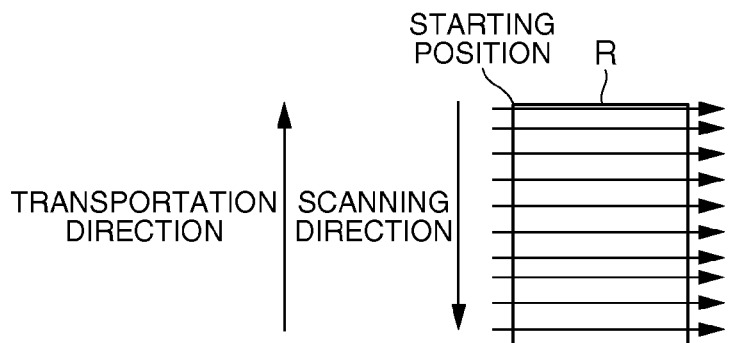
FIGS. 6A-6C describe the scanning operation using an optical scanner.
Figure 6B:
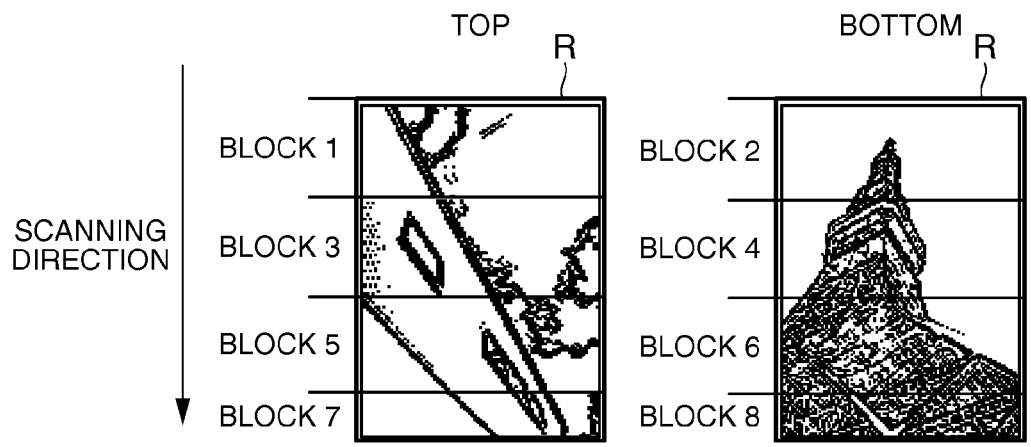
Figure 6C:
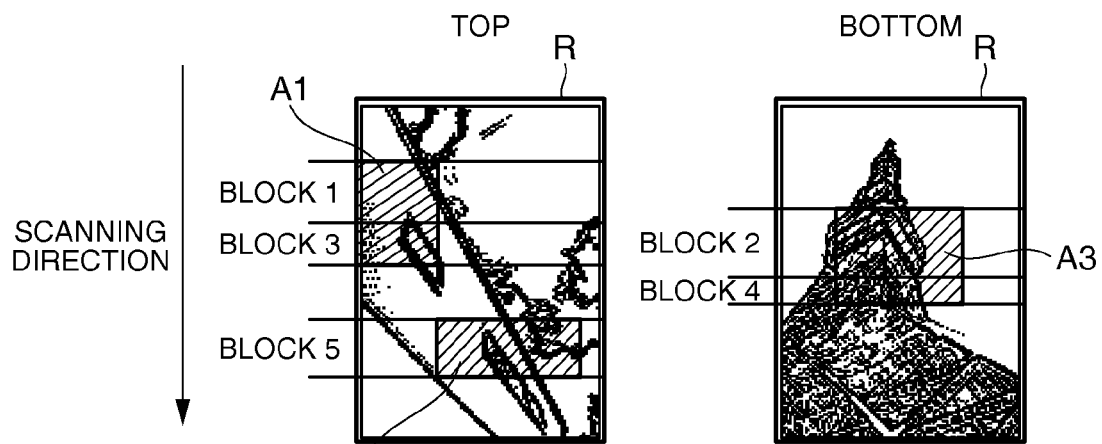

FIGS. 6A-6C illustrate the forward scanning operation of the dot impact printer 10. FIG. 6A shows the scanning direction, FIG. 6B schematically describes scanning by the dot impact printer 10 in the full scan mode, and FIG. 6C schematically describes operation in the partial scan mode.

When the dot impact printer 10 scans in the normal (forward) direction, the recording medium S passes the optical reader 110 and is scanned by the first scanner 111 and second scanner 112 while traveling from the front (the left in FIG. 2) of the dot impact printer 10 to the rear (the right in FIG. 2).

In this case, as shown in FIG. 6A, the recording medium S is scanned from the leading end of the scanning range R (the top in the figure) to the trailing end (the bottom in the figure). The image data of the one line scanned by the first scanner 111 and second scanner 112 is output to the gate array 45 line by line sequentially from the left end of the scanning range R (the beginning of the arrow) to the right end (the tip of the arrow). The left end of the leading edge of the scanning range R is therefore the scanning start position, and the right end of the trailing edge is the end position.

When a full scan is initiated by the command sent from the host computer 200, the CPU 40 divides the scanning range R into segments of a predetermined length in the scanning direction (subscanning direction) as shown in FIG. 6B. These segments are referred to as blocks. The scanning range R of the first scanner 111 and the scanning range R of the second scanner 112 are each segmented into plural blocks of a specified length, and the blocks are sequentially numbered alternately top and bottom from the leading end of the scanning direction. More specifically, the first block of the scanning range R on the top is block 1, the first block of the scanning range R on the bottom is block 2, and the remaining blocks are similarly numbered alternating top and bottom in the scanning direction 3, 4, . . . 8 as shown in the figure. The length of the last block is the length of the block remaining after dividing the scanning range R into blocks of the specified length.

Each block is the size of the process unit in which the image data from the first scanner 111 and second scanner 112 is stored, which blocks are then sent to the host computer 200. That is, each time the image data for one block is stored in the image buffer (not shown in the figure) in RAM 41, the CPU 40 sends the image data for that block to the host computer 200. The specified length, that is, the length of each block in the transportation direction (scanning direction) is determined according to the capacity of the image buffer (not shown in the figure) reserved in RAM 41. For example, if the image buffer has sufficient capacity to store 300 lines of full-color image data at the maximum resolution of 600 dpi, the length of one block is set appropriately to a length of 300 lines or less.

When scanning in the full scan mode, the CPU 40 controls the motor driver 46 to drive the media transportation motor 26 to convey the recording medium S at a specified speed while controlling the gate array 45 and driving the light sources of the first scanner 111 and second scanner 112 to generate the scanned image data based on the detection values from the photosensors and storing the scanned image data line by line to the image buffer in RAM 41.

The CPU 40 continues this operation without interrupting, conveying the recording medium S until the entire scanning range R is read by the first scanner 111 and second scanner 112. When scanning any block is completed (ends) during this operation and the image data for one block is stored in the image buffer of the RAM 41, the CPU 40 reads and sends the image data for that block from the image buffer to the host computer 200, and then deletes the scanned image data from the image buffer after transmission is completed. Deleting the scanned image data creates a large empty space in the image buffer again so that the next image data captured next can be stored.

Each time scanning one block is completed, the CPU 40 sends the captured image data to the host computer 200 as described above. Note that the order in which the image data captured from each block is sent is the order in which scanning is completed, and is not limited to the order of the block numbers.

When the CPU 40 sends the scanned image data to the host computer 200, it also sends additional information in a header indicating which side was scanned (top or bottom), the size of the scanned block, the block number, and the data length. If the image data is large, the CPU 40 can send the image data for one block in smaller segments, in which case information enabling the host computer 200 to rejoin the image data segments may also be added to the header.

When the command received from the host computer 200 specifies a partial scan, the CPU 40 sets the area to be scanned according to the scanning area specified in the scanning range R by the setup command as shown in FIG. 6C. In the example shown in FIG. 6C, areas A1 and A2 are set in the scanning range R of the top, and area A3 is set in the scanning range R of the bottom side of the recording medium S.

The CPU 40 configures the scan blocks according to the partial scan areas. If the length of an area in the scanning direction is shorter than the predetermined length of one block described above, the CPU 40 produces one block for the one area. The leading end and the trailing end of this block match the leading end and trailing end of the area. If the length of the area is greater than the predetermined block length, the CPU 40 segments the scanning area into blocks of the specified length starting from the leading end of the area in the scanning direction. In the example shown in FIG. 6C, areas A1 and A3 exceed the predetermined block length, area A1 is therefore divided into blocks 1 and 3, and area A3 is divided into blocks 2 and 4. The block numbers are assigned sequentially from the leading end of the first block alternating top and bottom in the same way as in the full scan mode.

Note that when there are plural scan areas defined across the width of the scanning range R, and the areas overlap in the scanning direction, all of the overlapping areas are treated as a single block. If the length of such a block in the scanning direction exceeds the maximum length of one block, the block is segmented into plural blocks in the scanning direction.

The CPU 40 then starts scanning areas A1 to A3 in the scanning range R. The CPU 40 controls the gate array 45 and motor driver 46 and continues the scanning operation without interrupting transportation of the recording medium S until all areas have been scanned by the first scanner 111 and second scanner 112. When reading any block on the top or bottom is completed and the image data for that block is stored in the image buffer in RAM 41 during this operation, the CPU 40 reads and sends the image data for that block from the image buffer to the host computer 200, and then deletes the image data from the image buffer after data transmission is completed. The transmission sequence in this case is the same as during the full scan mode, that is, in the order in which block scanning is completed and is not limited to the order of the block numbers.

When the CPU 40 sends the scanned image data to the host computer 200, it also sends additional information in a header indicating which side was scanned (top or bottom), the size of the scanned block, the block number, the data length, the area number, and the coordinates of the beginning and end positions of the area. If a single area is divided into plural blocks, information for rejoining the blocks constituting each area may also be included. In addition, if plural areas are contained in one block, the CPU 40 divides the scanned image data for the block into the individual areas, and sends the image data for each area to the host computer 200. If the size of the captured image data is large, the data can also be divided into smaller units for transmission to the host computer 200 in this partial scan mode.

The host computer 200 receives the scanned image data sent from the dot impact printer 10, and reconstructs the scanned image block by block based on the header information. In addition, when the host computer 200 specifies the full scan mode in the setup command sent to the dot impact printer 10, it reproduces images for the entire scanning range R of both the top and bottom sides by rejoining the blocks. In addition, when the partial scan mode is specified by the setup command, the host computer 200 reproduces the scanned image data for each area by rejoining the blocks when a single area is divided into plural blocks, and using the scanned image data contained in each block as is when a single block constitutes a single area.

Figure 7A:
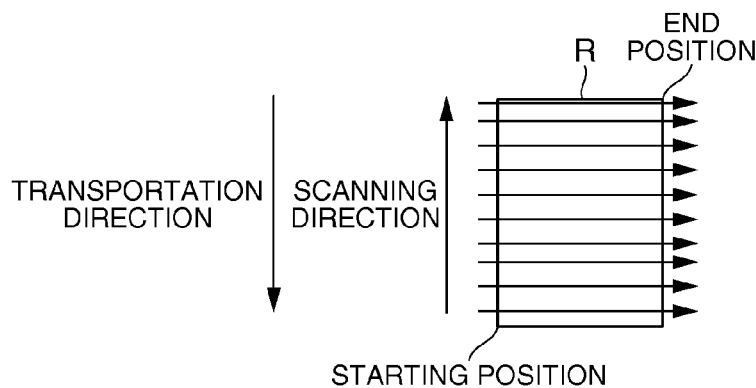
FIGS. 7A-7C describe the scanning operation using an optical scanner.
Figure 7B:
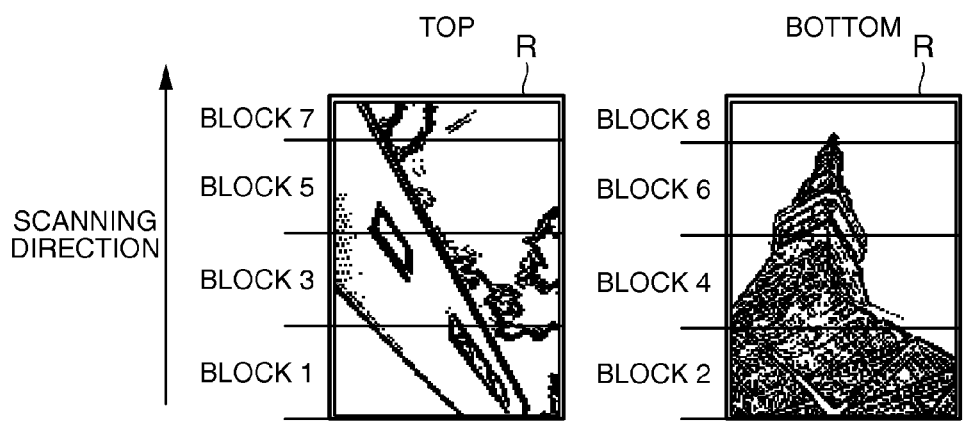
Figure 7C:
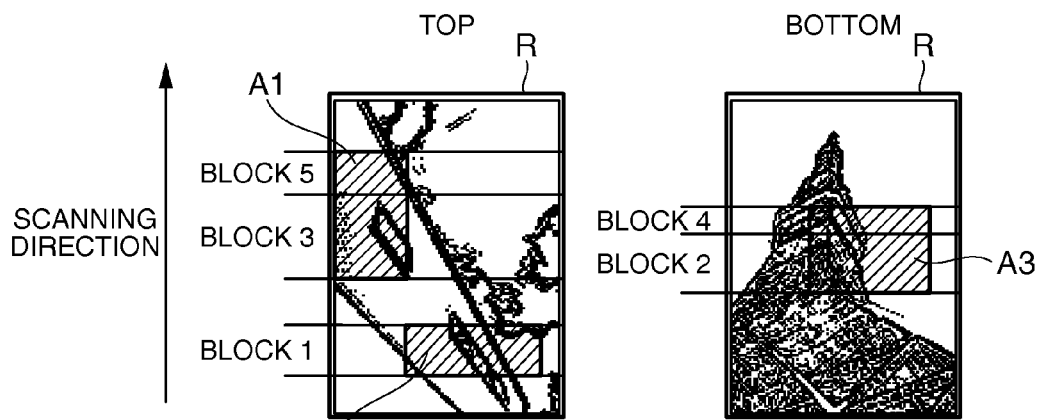

FIGS. 7A-7C illustrate the reverse scanning operation of the dot impact printer 10. FIG. 7A shows the scanning direction, FIG. 7B schematically describes scanning in the full scan mode, and FIG. 7C schematically describes operation in the partial scan mode.

When the dot impact printer 10 scans in the reverse direction, the recording medium S passes the optical reader 110 and is scanned by the first scanner 111 and second scanner 112 while traveling from the rear of the dot impact printer 10 to the front. In this case scanning proceeds from the trailing end of the scanning range R as shown in FIG. 7A (the bottom end in the figure) to the leading end (the top end in the figure). Because the scanned image of one line captured by the first scanner 111 and second scanner 112 is output sequentially from the left end of the scanning range R through the gate array 45, the left end of trailing edge of the scanning range R is the scanning start position and the right edge of the leading end is the end position.

When scanning in reverse in the full scan mode, the scanning range R is segmented into blocks from the trailing end as shown in FIG. 7B. The block numbers are assigned sequentially from the end at the leading edge during scanning while alternating between the top and bottom. Other aspects of the operation are the same as during a full scan in the forward direction.

When scanning in reverse in the partial scan mode, the areas to be scanned are configured based on the setup command received from the host computer 200 as shown in FIG. 7C, and the areas are segmented into blocks from the trailing end of the scanning range R, which is the leading end in the scanning direction. Areas that exceed the maximum length of one block are divided into blocks of the specified length referenced to the trailing end of the scanning range R. Other aspects of the operation are the same as during a partial scan in the forward direction.

The top and bottom of the scanned image data captured in the reverse direction is inverted from the image data captured when scanning forward. As a result, the CPU 40 of the dot impact printer 10 may execute a process to invert the image data before transmission to the paper exit 20, but because the host computer 200 that sent the setup command has information about the scanning direction, the host computer 200 can use this information to rotate the scanned image data 180 degrees.

Figure 8:
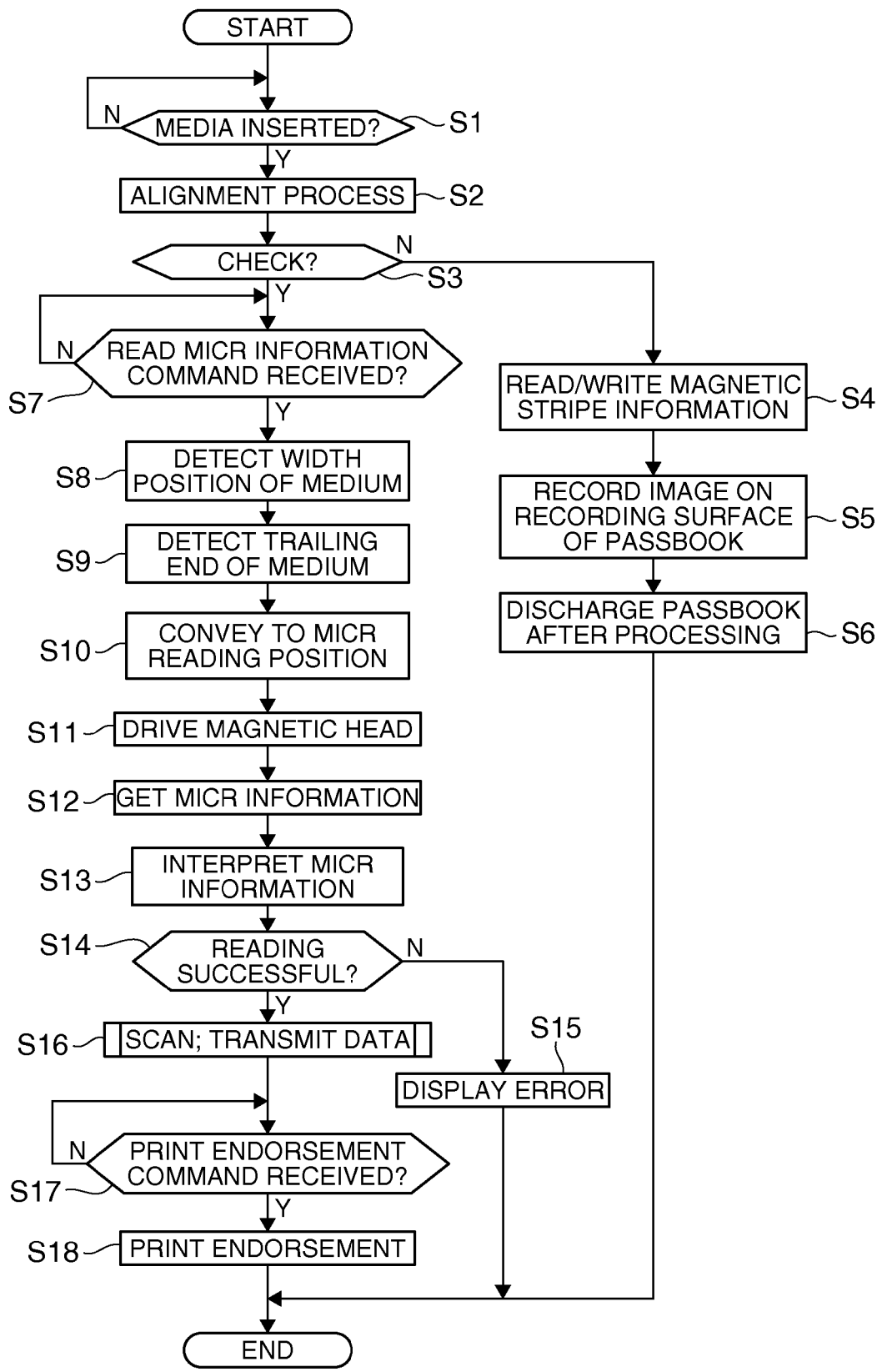
FIG. 8 is a flow chart of the operation of the dot impact printer.

FIG. 8 is a flow chart describing the operation of the dot impact printer 10 according to this embodiment of the invention.

The CPU 40 functions as a transmission control unit in the following operation.

When a recording medium S is inserted to the manual insertion opening 15 and the media edge sensors 47 detect the leading end of the recording medium S (step S1 returns Yes), the CPU 40 of the dot impact printer 10 drives the alignment plate 38 to protrude into the transportation path P of the recording medium S and operates the media transportation motor 26 to align the recording medium S (step S2).

The CPU 40 then determines whether the detected recording medium S is a check or a passbook (step S3).

The CPU 40 can determine the type of recording medium S based on information acquired from the host computer 200. Alternatively, the CPU 40 can detect the locations of the leading end and side of the recording medium S using the media edge sensors 47 and media width sensor 55, and determine the type of recording medium S based on this position and size information. Further alternatively, based on the positions of the leading end and side of the recording medium S detected using the media edge sensors 47 and media width sensor 55, the CPU 40 may attempt to read the MICR information using the magnetic head 34, and determine the type of recording medium S by determining whether or not MICR information is found in the MICR area MA by this reading attempt. In this embodiment of the invention the CPU 40 acquires from the host computer 200 information identifying the type of recording medium S (check or passbook), information such as the size of the check if the recording medium S is a check, information about the location of the MICR area MA, and information about the transportation distance, and determines based on the received information whether the recording medium S is a check or a passbook.

If the recording medium S is not a check (step S3 returns No) and the CPU 40 determines that the recording medium S is a passbook, for example, it conveys the recording medium S to the position where the magnetic stripe on the passbook can be read by the magnetic head 34, and then reads and/or writes the magnetic stripe using the magnetic head 34 (step S4).

The CPU 40 then conveys the recording medium S to the position of the recording head 18, records on the recording surface using the recording head 18 (step S5), and then discharges the recording medium S from the manual insertion opening 15 (step S6) to complete the process.

If the recording medium S is a check (step S3 returns Yes), the CPU 40 determines if a MICR information read command was received from the host computer 200 (step S7). If the CPU 40 determines that a MICR read command was received (step S7 returns Yes), it retracts the alignment plate 38 from the transportation path P, conveys the recording medium S using the media transportation mechanism 100 until at least the leading end of the recording medium S is directly below the media width sensor 55, then drives the carriage drive motor 56 (FIG. 5) to move the carriage 19 in the main scanning direction, and detects the widthwise position of the recording medium S based on the output signals from the media width sensor 55 and the position of the carriage 19 in the main scanning direction (step S8). The CPU 40 then monitors the output signals from the media edge sensors 47 while conveying the recording medium S using the media transportation mechanism 100, and detects the trailing end of the recording medium S (step S9).

The CPU 40 then conveys the recording medium S using the media transportation mechanism 100 to the position where the MICR area MA can be read by the magnetic head 34 (step S10), controls the motor driver 46 to operate the magnetic head drive motor 57, and reads the MICR text in the MICR area MA using the magnetic head 34 (step S11).

The MICR information read by the magnetic head 34 is then digitized by the gate array 45, and the CPU 40 acquires the output digital data (step S12). The CPU 40 then extracts the character data from the digital data and converts it to text information (step S13). Whether the number of uninterpretable characters in the extracted text exceeds a predetermined number, or whether the character count is within the range of the predetermined count and reading the MICR information was successful, is then determined (step S14).

If the number of characters exceeds the predetermined count and there is an unreadable character (step S14 returns No), an error is output, the recording medium S is discharged (step S15), and operation ends. The error can be reported in step S15 using a display unit disposed to the dot impact printer 10, sending information indicating that an error occurred to the host computer 200, or using both methods.

If the number of uninterpretable characters does not exceed the preset count and reading was successful (step S14 returns Yes), the CPU 40 scans the recording medium S using the optical reader 110 and sends the captured image data to the host computer 200 (step S16). The CPU 40 then waits to receive a command to print an endorsement on the back from the host computer 200 (step S17). When an endorsement print command is received (step S17 returns Yes), the CPU 40 reverses the media transportation motor 26 to convey the recording medium S to below the recording head 18, and then drives the carriage drive motor 56 and recording head 18 to print an endorsement indicating that the check was processed on the back of the recording medium S (step S18). When printing the endorsement is completed, the CPU 40 drives the media transportation motor 26 again to discharge the recording medium S from the manual insertion opening 15 or the paper exit 20.

Note that if a command to execute the discharge during transmission process is contained in the setup command as described below, the recording medium S is discharged after scanning is completed, and step S17 and step S18 are therefore not executed.

Figure 9:
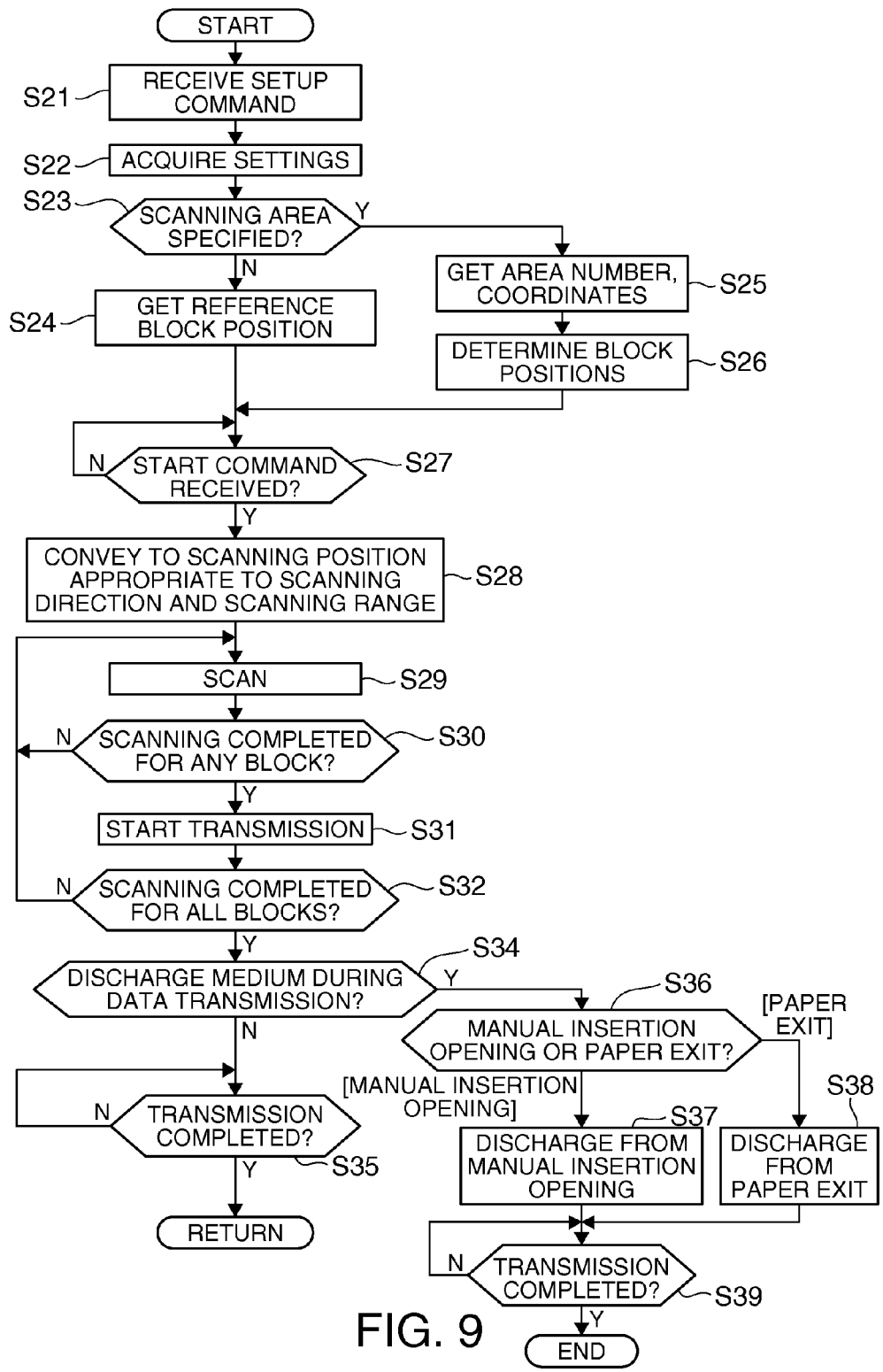
FIG. 9 is a flow chart of the operation of the dot impact printer.

FIG. 9 is a flow chart of the scanning operation executed by the dot impact printer 10, and describes the operation executed in step S16 in FIG. 8 in further detail.

In the following operation the CPU 40 functions as a discharge control unit.

The CPU 40 receives the setup command sent from the host computer 200 (step S21), and acquires the settings content specified by the setup command (step S22). As described above, the setup command includes a command indicating whether or not to execute the discharge during transmission process, and if the discharge during transmission process is to be executed, a command specifying whether to discharge the recording medium S from the manual insertion opening 15 or paper exit 20.

The CPU 40 determines if the area to be scanned is specified in the setup command (step S23). If the scanning area is not specified (step S23 returns No), it acquires the position of the block referenced to scan the entire scanning range R based on the scanning direction specified in the setup command (step S24). The position of the reference block used for a full scan of the scanning range R is stored in EEPROM 42, for example.

If a specific scanning area is specified in the setup command (step S23 returns Yes), the CPU 40 acquires the area numbers and the coordinates of the start and end positions of each area (step S24), positions the areas in the scanning range R, and determines the positions of the blocks for each area based on the scanning direction specified in the setup command (step S26).

After the block positions are acquired or determined, the CPU 40 waits to receive a start scanning command from the host computer 200 (step S27). When a start scanning command is received (step S27 returns Yes), the CPU 40 conveys the recording medium S to the scanning start position of the optical reader 110 using the media transportation mechanism 100 based on the scanning direction specified in the setup command, whether a full scan or partial scan is specified, the position of the specified area if a partial scan is specified, and the current position of the recording medium S (step S28), and scans while conveying the recording medium S using the first scanner 111 and second scanner 112 (step S29).

While scanning continues the CPU 40 determines if there is a block for which scanning is not completed (step S30). If there is a block for which scanning is completed (step S30 returns Yes), the CPU 40 starts the process of reading and sending the image data captured for that block from the image buffer in RAM 41 to the host computer 200 (step S31), and then deletes the image data for that block from the image buffer after data transmission is completed.

The CPU 40 then determines if scanning all blocks was completed (step S32). If there is a block for which scanning is not completed (step S32 returns No), the CPU 40 returns to step S29, continues scanning, and if a new block for which scanning is completed is detected, sends the image data for that block to the host computer 200.

When scanning all blocks in the scanning range R of both top and bottom sides is completed (step S32 returns Yes), the CPU 40 determines whether or not to execute the discharge during transmission process based on the settings acquired in step S22 (step S34).

If the discharge during transmission process is not executed (step S34 returns No), the CPU 40 monitors whether or not transmitting the image data for all blocks to the host computer 200 was completed (step S35). If transmission is completed (step S35 returns Yes), scanning ends and control goes to step S17 in FIG. 8.

However, if the discharge during transmission process is executed (step S34 returns Yes), the CPU 40 determines whether the recording medium S is to be discharged from the manual insertion opening 15 or paper exit 20 (step S36). If discharge from the manual insertion opening 15 is instructed (step S36 returns "manual insertion opening"), the CPU 40 controls the media transportation motor 26 to discharge the recording medium S from the manual insertion opening 15 (step S37). If discharge from the paper exit 20 is instructed (step S36 returns "paper exit"), the CPU 40 controls the media transportation motor 26 to discharge the recording medium S from the paper exit 20 (step S38). The process of discharging the recording medium S in step S37 and step S38 is executed even if the captured image data is being transmitted. That is, the recording medium S is discharged after the optical reader 110 finishes scanning the recording medium S even if the captured image data is still being transmitted to the host computer 200.

After the recording medium S is discharged, the CPU 40 monitors whether transmitting the captured image data is completed (step S39), and ends the process if data transmission is completed (step S39 returns Yes).

The discharge during transmission process thus discharges the recording medium S immediately after the optical reader 110 finishes scanning the recording medium S even if the captured image data is still being transmitted to the host computer 200. As a result, the time required by the entire process can be shortened and throughput can be improved compared with the method of the related art in which transmitting the captured image data starts after scanning the recording medium S is completed and the recording medium S is only discharged after transmitting the image data is completed.

In this embodiment of the invention, the CPU 40 also executes the discharge during the transmission process appropriately after determining whether or not to execute the discharge during the transmission process based on a setup command input from the host computer 200 before the optical reader 110 scans the recording medium S.

After the optical reader 110 finishes scanning the recording medium S, the CPU 40 could alternatively output data indicating that scanning the recording medium S was completed to the host computer 200 based on a predetermined protocol, the host computer 200 could then return a command to start the recording medium S discharge operation to the CPU 40, and as a result the recording medium S could be discharged immediately after scanning the recording medium S is completed even if the captured image data is still being transmitted to the host computer 200. While this configuration can improve throughput, it also requires the CPU 40 and host computer 200 to exchange information according to a predetermined protocol after the optical reader 110 finishes scanning the recording medium S, thus complicating the process and inviting a drop in efficiency. In addition, because data must be exchanged according to a specified protocol while the captured image data is being transmitted, the amount of data that must be exchanged between the CPU 40 and host computer 200 is increased, and a drop in the transmission speed is incurred by the increased amount of data.

As a result, the invention includes a command specifying whether or not to execute the discharge during transmission process in the setup command that is input to the CPU 40 before the optical reader 110 scans the recording medium S, the CPU 40 executes the discharge during transmission process based on this command, and the discharge during transmission process can therefore be executed smoothly and reliably.

As described above the photosensors of the first scanner 111 and second scanner 112 are offset with the first scanner 111 positioned approximately 5 mm in front in this embodiment of the invention. As a result, scanning the scanning range R on the top side is completed before the scanning range R on the bottom is completed when scanning in the forward direction, and when scanning in reverse scanning the scanning range R on the bottom is completed before scanning the scanning range R on the top is completed.

In a dot impact printer 10 according to this embodiment of the invention described above, the CPU 40 drives the optical reader 110 to read blocks defined in the scanning range R of the optical reader 110, and when the optical reader 110 finishes scanning any block, reads and sends the image data for the block for which scanning was completed from the image buffer of the RAM 41 even if scanning other blocks is not completed. Because data transmission thus does not wait until scanning all blocks is completed, the wait associated with image data transmission can be shortened. As a result, the overall scanning process can be accelerated and convenience can be improved. More particularly, the waiting time can be greatly shortened when the captured image data is large, such as when the scanning resolution is high or during a full-color scan. Yet further, the capacity of the image buffer in RAM 41 only needs to be sufficient to store the image data captured for one block, and less storage capacity is needed than if the image data captured for the entire scanning range R is stored.

The optical reader 110 has a first scanner 111 that reads one side of the recording medium S and a second scanner 112 that reads the other side of the recording medium S disposed on opposite sides of the transportation path P so that both sides of the recording medium S can be scanned. The CPU 40 drives the optical reader 110 to scan blocks set in the scanning range R of the first scanner 111 and second scanner 112, and when scanning any block is completed, reads and sends the image data for the block for which scanning was completed from the image buffer even if scanning a block set in the scanning range R on the same side or set in the scanning range R of the other side is not completed. As a result, the wait time associated with transmitting the scanned image data can be shortened, and both sides of the recording medium S can be scanned more quickly. Furthermore, the capacity of the image buffer in RAM 41 can be smaller than the capacity required to store the image data captured from both sides.

When a partial scan is executed to read a specified area in the scanning range R, the CPU 40 sets the blocks for areas exceeding the specified block length by dividing the area into segments of the specified length, and when the optical reader 110 finishes scanning any block, reads and transmits the image data for the block for which scanning was completed from the image buffer. As a result, even if the specified area is large and scanning the entire area is time-consuming, transmission of the scanned image data can start in less time and the wait time associated with transmitting the image data can be greatly shortened.

In this case the CPU 40 segments the specified area into blocks, and when sending the image data for a block to the host computer 200 adds and sends information identifying the original area to which the block belongs. The host computer 200 receiving the image data can therefore reassemble an image of the complete specified area from the image data divided into blocks.

Furthermore, when a full scan that reads the entire scanning range R is specified by a command from the host computer 200, the CPU 40 divides the scanning range R into plural blocks and transmits the scanned image data in block units. Delaying transmission until scanning the entire scanning range R is completed is therefore not necessary, and the wait time associated with image data transmission can be shortened. In addition, when a full scan is specified, the wait time can be automatically shortened even without executing an operation or command for setting the positions of the blocks, and convenience can be further improved.

More specifically, the CPU 40 is configured to selectively execute a full scan that scans the entire scanning range R, or a partial scan that scans part of the scanning range R, based on a setup command and start scanning command sent from the host computer 200. When a full scan is selected, the CPU 40 divides the scanning range R into a plurality of blocks, and when a partial scan is selected, configures the blocks based on the area specified for scanning in the scanning range R. The CPU 40 then sequentially scans the blocks with the optical reader 110, and when scanning any block is completed, reads and sends the image data captured from the block for which scanning was completed from the image buffer in RAM 41 even if it is before scanning another block is completed. If a partial scan is selected and the length of an area to be scanned is longer in the transportation direction of the recording medium S than a predetermined length, the area is segmented into blocks of the specified length. As a result, the wait time associated with transmitting the scanned image data can be shortened and performance can be improved whether scanning the entire scanning range R or scanning only an area in one part of the scanning range R.

Figure 10B:
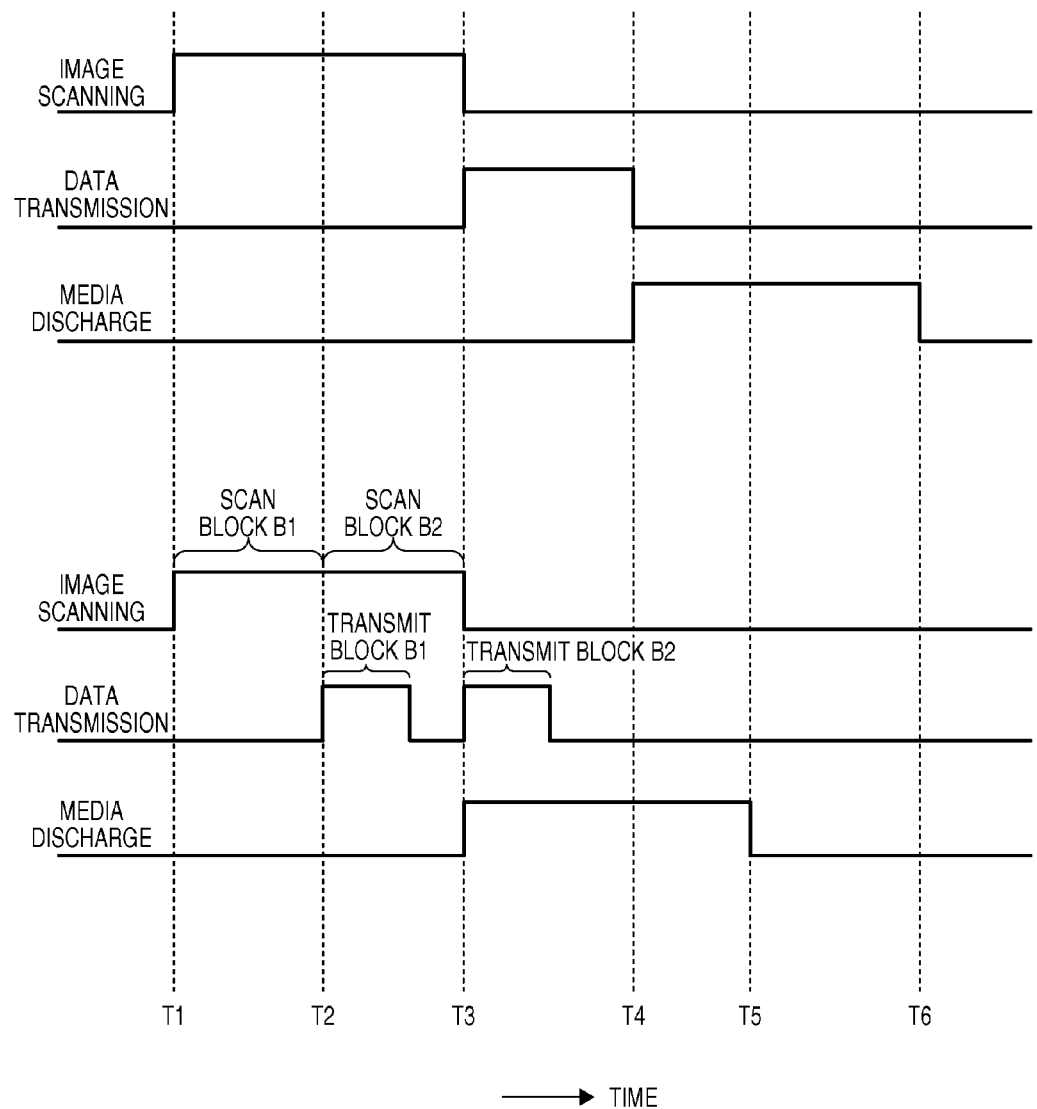

FIGS. 10A and 10B are timing charts of the operation from scanning an image using the optical reader 110 to discharge of the recording medium S. FIG. 10A is a timing chart of this operation when executed by a dot impact printer according to the related art, and FIG. 10B is a timing chart of the operation when executed by the dot impact printer 10 according to this embodiment of the invention.

The scanning range is divided into two blocks (block B1 and block B2) in this example.

The timing of the operation of a dot impact printer according to the related art is described first with reference to FIG. 10A.

As shown in FIG. 10A, the optical reader 110 of the dot impact printer according to the related art starts scanning block B1 and block B2 in the recording medium S at time T1, and finishes scanning block B1 and block B2 at time T3. Transmission of the image data captured from block B1 and block B2 to the host computer 200 then starts at time T3 simultaneously to finishing scanning the recording medium S, and transmission of the image data is completed at time T4. The operation of discharging the recording medium S then starts at time T4 simultaneously to the end of image data transmission, and the discharge operation ends at time T6.

With the dot impact printer 10 according to this embodiment of the invention, however, the optical reader 110 starts scanning the recording medium S at time T1 as shown in FIG. 10B, and when capturing an image of block B1 is completed at time T2, sending the image data for block B1 to the host computer 200 starts before scanning block B2 is completed.

Sending the image data for block B2 to the host computer 200 then starts when scanning block B2 ends at time T3.

The operation of discharging the recording medium S then starts simultaneously to the completion of scanning block B2 at time T3. This discharge operation executes while transmitting the image data captured for block B2 to the host computer 200, and ends at time T5.

As will be apparent from FIG. 10A and FIG. 10B, transmission of the image data for all scanned blocks is completed sooner with the dot impact printer 10 according to this embodiment of the invention than with the dot impact printer according to the related art. In addition, the timing of the completion of the operation of discharging the recording medium S is earlier in the dot impact printer 10 according to this embodiment of the invention than the dot impact printer according to the related art (T5 vs. T6). More specifically, the time of the process including scanning the recording medium S, sending the image data captured for the scanned image, and discharging the recording medium S can be shortened and throughput can be improved.

Because throughput can be improved and the recording medium S discharge operation ends sooner, the user can use the time saved to ready and set the recording medium S to be processed next in the dot impact printer 10, file the discharged recording medium S, or perform other tasks, thereby improving convenience.

Note that transmission of the image data for all blocks ends and the recording medium S discharge operation ends reliably sooner in the dot impact printer 10 according to this embodiment of the invention than the dot impact printer according to the related art. Therefore, even if much time is required to transmit the captured image data and transmitting the captured image data ends after the recording medium S discharge operation, the time required to complete the entire process can be reliably shortened compared with the dot impact printer according to the related art.

As described above, after the optical reader 110 finishes scanning the surface of the recording medium S, the CPU 40 that functions as a discharge control unit in the foregoing embodiment controls the media transportation motor 26 to discharge the recording medium S from the manual insertion opening 15 or paper exit 20 while sending at least the captured image data to the host computer 200.

As a result, the recording medium S can be discharged while sending the captured image data to the host computer 200, and throughput can be improved compared with the related art in which the discharge operation executes after transmitting the captured image data ends.

Note that transmission of captured image data to the host computer 200 includes data transmission preparation time.

In addition, scanning the recording medium S includes scanning either or both sides.

The CPU 40 that functions as a discharge control unit in the foregoing embodiment executes the recording medium S discharge operation based on a setup command input from the host computer 200 before the optical reader 110 scans the surface of the recording medium S.

As a result, the CPU 40 can smoothly and reliably selectively discharge the recording medium S while transmitting the image data based on a setup command that is input before the recording medium is scanned.

The dot impact printer 10 according to this embodiment of the invention has two paper exits, a manual insertion opening 15 and paper exit 20, as exits from which the recording medium S can be discharged. A command specifying whether to discharge the recording medium S from the manual insertion opening 15 or paper exit 20 is also contained in the setup command.

As a result, the CPU 40 that functions as a discharge control unit can smoothly and reliably discharge the recording medium S from the desired paper exit, that is, either the manual insertion opening 15 or paper exit 20, while transmitting the captured image data.

The CPU 40 of a dot impact printer 10 according to this embodiment of the invention functions as a transmission control unit that, when an optical reader 110 scans one or a plurality of areas set in the scanning range of the optical reader 110 and finishes scanning any area, reads and transmits the captured image data for the area for which scanning was finished from RAM 41 to the host computer 200 even if before scanning another area is finished. The CPU 40 functioning as the discharge control unit also discharges the recording medium S while transmitting at least the captured image data to another device.

As a result, when an area set in the scanning range is optically scanned, the captured image data is stored, and scanning at least one area is completed, the CPU 40 functioning as a transmission control unit transmits the captured image data from the area for which scanning was completed even if there is another area for which scanning is not completed. Transmission therefore does not wait until scanning all areas is completed, the time associated with transmitting the captured image data can be shortened, and throughput can be improved.

A preferred embodiment of the invention is described above, but the invention is not limited thereto. For example, a configuration in which the alignment mechanism 28, recording head 18, and optical reader 110 are disposed in this order in the transportation path P of the recording medium S, is described in the foregoing embodiment, but the invention is not so limited and the locations of these devices can be changed as desired. For example, the optical reader 110 could be disposed closest to the manual insertion opening 15.

In addition, the foregoing embodiment describes a control unit that: is disposed on a control circuit board (not shown in the figure) installed in the dot impact printer 10; has the functions shown in the function blocks in FIG. 4; and controls other parts of the dot impact printer 10, but a device externally connected to the dot impact printer 10 could function as the function units shown in FIG. 4 and control operation of the dot impact printer 10. In addition, the function blocks shown in FIG. 4 are rendered by cooperation of hardware and software components, but the specific configuration of the hardware component and the specifications of the software component are not limited, and the detailed configurations thereof can be changed as desired.

Furthermore, the first scanner 111 and second scanner 112 in the foregoing embodiment are described as using RGB light sources to enable monochrome or color scanning, but a configuration using an infrared light source to enable infrared scanning is also conceivable. Furthermore, because magnetic ink has higher infrared absorbance than normal ink, infrared light can be used to read only the characters printed in magnetic ink, thereby enabling optically reading the MICR text in the MICR area MA efficiently.

In the foregoing embodiment reading by the magnetic head 34 precedes scanning by the first scanner 111 and second scanner 112, but scanning by the first scanner 111 and second scanner 112 could precede reading by the magnetic head 34. In this configuration, the location of the MICR area MA containing the MICR text can be determined from the results of an OCR process, and reading by the magnetic head 34 can be controlled accordingly. Furthermore, because the area where the MICR information is recorded can be easily identified using infrared scanning, the magnetic head 34 can be controlled to read the identified area.

The foregoing embodiment describes the invention applied to a flatbed scanner that conveys the recording medium S horizontally, but the invention is not so limited and can be applied to a device with a transportation path that conveys recording media S such as checks and slips standing vertically on edge.

The foregoing embodiment also describes a dot impact printer 10 having an optical reader 110, but the invention is not so limited and can be applied to other configurations having an optical reading unit comparable to the optical reader 110 disposed in an inkjet printer, thermal printer, or laser printer, for example. Yet further, the invention is not limited to devices that are used as a stand-alone printer, and configurations having an optical reading unit comparable to the optical reader 110 disposed in another device (such as an ATM (automated teller machine) or CD (cash dispenser)) are also conceivable.

Yet further, the invention is not limited to configurations having an optical reader 110 in unison with a device that records text or images on paper or other recording medium, and can be applied to a wide range of other devices including stand-alone scanners and photocopiers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical reading device comprising:
    a transportation unit that conveys a medium to be scanned;
    an optical reading unit that is disposed in a medium transportation path and optically reads the medium conveyed by the transportation unit;
    a storage unit that stores a captured image captured by the optical reading unit;
    a transmission unit that reads and transmits the captured image stored in the storage unit to another device; and
    a discharge control unit that controls the transportation unit and discharges the medium while the transmission unit is transmitting the captured image to the other device after scanning the medium by the optical reading unit is completed;
    wherein the discharge control unit controls the transportation unit based on a command that is input from the other device before the optical reading unit scans the medium, and specifies whether or not to discharge the medium while the captured image is being transmitted.

2. The optical reading device described in claim 1, comprising:
    a plurality of media exits from which the medium can be discharged;
    wherein the command includes information specifying from which of the plural media exits the medium is to be discharged.

3. An optical reading device, comprising:
    a transportation unit that conveys a medium to be scanned;
    an optical reading unit that is disposed in a medium transportation path and optically reads the medium conveyed by the transportation unit;
    a storage unit that stores a captured image captured by the optical reading unit;
    a transmission unit that reads and transmits the captured image stored in the storage unit to another device;
    a discharge control unit that controls the transportation unit and discharges the medium while the transmission unit is transmitting the captured image to the other device after scanning the medium by the optical reading unit is completed; and
    a transmission control unit that controls the optical reading unit and the transmission unit, causes the optical reading unit to read one or a plurality of areas set in a scanning range of the optical reading unit, and when scanning at least one area is completed, reads and transmits the captured image of the area for which scanning was completed from the storage unit to the other device even if scanning another area is not yet completed;
    wherein the discharge control unit controls the transportation unit and discharges the medium while the transmission control unit sends at least the captured image of the area for which scanning was completed to the other device.

4. A method of controlling an optical reading device, comprising:
    conveying a medium to be scanned;
    scanning the medium to capture a captured image;
    storing the captured image; and
    discharging the medium while transmitting the captured image to another device after scanning the medium is completed based on a command that is input from the other device before scanning the medium, the command specifying whether or not to discharge the medium while the captured image is being transmitted.

5. An optical reading device, comprising:
    a transportation mechanism that conveys a medium to be scanned;
    an optical reader that is disposed in a medium transportation path and optically reads the medium conveyed by the transportation mechanism;
    a memory that stores a captured image captured by the optical reader;
    a CPU that reads and transmits the captured image stored in the memory to another device, controls the transportation mechanism and discharges the medium while the CPU is transmitting the captured image to the device after scanning the medium by the optical reader is completed;
    wherein the CPU controls the transportation mechanism based on a command that is input from the other device before the optical reader scans the medium, and specifics whether or not to discharge the medium while the captured image is being transmitted.

* * * * *